(12) United States Patent
Schmitz et al.

(10) Patent No.: US 12,000,689 B2
(45) Date of Patent: Jun. 4, 2024

(54) ENVIRONMENTAL SCANNING AND IMAGE RECONSTRUCTION THEREOF

(71) Applicant: FARO Technologies, Inc., Lake Mary, FL (US)

(72) Inventors: Evelyn Schmitz, Korntal-Münchingen (DE); Heiko Bauer, Moeglingen (DE); Steffen Kappes, Oedheim-Degmarn (DE); Denis Wohlfeld, Ludwigsburg (DE)

(73) Assignee: FARO Technologies, Inc., Lake Mary, FL (US)

( * ) Notice: Subject to any disclaimer, the term of this patent is extended or adjusted under 35 U.S.C. 154(b) by 385 days.

(21) Appl. No.: 17/395,748

(22) Filed: Aug. 6, 2021

(65) Prior Publication Data
US 2022/0049948 A1    Feb. 17, 2022

Related U.S. Application Data

(60) Provisional application No. 63/066,350, filed on Aug. 17, 2020.

(51) Int. Cl.
*G01B 11/04* (2006.01)
*G01B 11/25* (2006.01)
*G02B 26/10* (2006.01)

(52) U.S. Cl.
CPC .......... *G01B 11/04* (2013.01); *G01B 11/2518* (2013.01); *G02B 26/101* (2013.01)

(58) Field of Classification Search
CPC ....... G01S 7/4812; G01S 17/89; G01B 11/24; G01B 11/2518; G01B 11/04; G01B 5/0002; G02B 26/101
See application file for complete search history.

(56) References Cited

U.S. PATENT DOCUMENTS

| | | | |
|---|---|---|---|
| 7,733,544 B2 | 6/2010 | Becker et al. | |
| 9,074,878 B2 | 7/2015 | Steffey et al. | |
| 9,513,107 B2 | 12/2016 | Zweigle et al. | |
| 9,551,575 B2 | 1/2017 | Bridges et al. | |
| 9,561,938 B2 | 2/2017 | Kilpelainen | |
| 9,957,136 B2 | 5/2018 | Hawkins et al. | |
| 10,132,611 B2 | 11/2018 | Steffey et al. | |
| 10,175,360 B2 | 1/2019 | Zweigle et al. | |
| 10,843,902 B2 | 11/2020 | Studer et al. | |
| 2007/0132986 A1* | 6/2007 | Oka | G02F 1/1309 356/218 |
| 2010/0309452 A1* | 12/2010 | Qiu | G01B 17/00 356/3 |

(Continued)

*Primary Examiner* — Sang H Nguyen
(74) *Attorney, Agent, or Firm* — McCarter & English, LLP; Dave S. Christensen

(57) ABSTRACT

Scanning systems and methods for measuring shafts are described. The scanning systems include a support structure and a scanner mounted to the support structure, at least one fixed guide arranged such that the support structure is configured to move along the at least one fixed guide, at least one positional guide arranged such that at least one positional guide is connected to the support structure to guide movement of the scanner along the at least one fixed guide, and an encoder operably coupled to the at least one positional guide and configured to measure, at least, a distance from the encoder to the support structure.

19 Claims, 7 Drawing Sheets

(56) References Cited

U.S. PATENT DOCUMENTS

| | | | |
|---|---|---|---|
| 2012/0033209 A1* | 2/2012 | Osterkamp | G01N 29/075 356/244 |
| 2014/0000985 A1* | 1/2014 | Fukui | B66B 5/022 187/247 |
| 2016/0311648 A1* | 10/2016 | Vaarala | G01S 17/46 |
| 2017/0038204 A1* | 2/2017 | Kilpeläinen | B66B 19/00 |
| 2018/0172439 A1* | 6/2018 | Kilpelainen | G01B 11/272 |
| 2020/0299105 A1* | 9/2020 | Cambruzzi | B66B 19/002 |
| 2021/0016996 A1* | 1/2021 | Makinen | B66B 7/024 |
| 2021/0156666 A1* | 5/2021 | Cambruzzi | B66B 19/00 |

* cited by examiner

ENVIRONMENTAL SCANNING AND IMAGE RECONSTRUCTION THEREOF

CROSS-REFERENCE TO RELATED APPLICATIONS

This application claims the benefit of U.S. Application Ser. No. 63/066,350, filed Aug. 17, 2020, the disclosure of which is incorporated herein by reference in its entirety.

BACKGROUND

The subject matter disclosed herein relates to systems and methods for measuring three-dimensional (3D) coordinates of a scanned environment, and in particular, to systems and methods for precision imaging and measurements of shafts, tunnels, wells, buildings, road constructions, and other similar long, narrow, and homogenous structures.

Highly precise and efficient 3D measurement of long and narrow shafts and similar structures can be a challenge. If, for example, a homogeneous elevator shaft is to be optically scanned, many scan positions may be performed at the exits of the shaft to obtain the desired results. Even though a laser scanner has a long range, such as of up to 350 m for example, due to the narrow angle of the optical path of the 3D scanner, beginning at about a distance of 50 m between the scanner and a wall of the shaft, few three-dimensional-measurements may be recorded. As such, moving a scanner from one position to another along a shaft may be performed for complete scanning of a shaft. Such movement, placement, and scanning can be a time-consuming process. Accordingly, improved scanning mechanisms for shafts and similar structures may be desirable.

BRIEF DESCRIPTION

According to some embodiments, scanning systems for measuring shafts are provided. The scanning systems include a support structure, a scanner mounted to the support structure, at least one fixed guide, wherein the support structure is configured to move along the at least one fixed guide, at least one positional guide, wherein the at least one positional guide is connected to the support structure to guide movement of the scanner along the at least one fixed guide, and an encoder operably coupled to the at least one positional guide and configured to measure, at least, a distance from the encoder to the support structure.

In addition to one or more of the features described above, or as an alternative, further embodiments of the scanning systems may include at least one stabilizer arranged between the scanner and the support structure, wherein the at least one stabilizer is configured to minimize relative tilt between the scanner and the support structure.

In addition to one or more of the features described above, or as an alternative, further embodiments of the scanning systems may include an inertial measurement unit configured to measure a tilt of at least one of the support structure and the scanner.

In addition to one or more of the features described above, or as an alternative, further embodiments of the scanning systems may include that the at least one fixed guide is one of a rope, a cable, a rod, a pole, and a wire.

In addition to one or more of the features described above, or as an alternative, further embodiments of the scanning systems may include that the at least one positional guide is one of a rope, a cable, a rod, a pole, and a wire.

In addition to one or more of the features described above, or as an alternative, further embodiments of the scanning systems may include that the scanner is a laser scanner.

In addition to one or more of the features described above, or as an alternative, further embodiments of the scanning systems may include a controller configured to receive encoding data from the encoder and scanning data from the scanner, the controller configured to correlate the encoding data and the scanning data to determine a location of the scanning data based on a location of the scanner.

In addition to one or more of the features described above, or as an alternative, further embodiments of the scanning systems may include at least one buffer extending from the support structure and configured to prevent contact of the scanner with an external structure.

In addition to one or more of the features described above, or as an alternative, further embodiments of the scanning systems may include that the buffer comprises a biasing element and a roller, the roller configured to contact the external structure.

In addition to one or more of the features described above, or as an alternative, further embodiments of the scanning systems may include that the buffer includes an extension rod, wherein the extension rod is attached to the support structure, with the biasing element and the roller arranged at an end of the extension rod.

In addition to one or more of the features described above, or as an alternative, further embodiments of the scanning systems may include that the at least one fixed guide is configured to be secured to an end of a shaft.

In addition to one or more of the features described above, or as an alternative, further embodiments of the scanning systems may include one or more targets configured to be arranged along a shaft and detected by the scanner.

In addition to one or more of the features described above, or as an alternative, further embodiments of the scanning systems may include a machine configured to play out the positional guide.

In addition to one or more of the features described above, or as an alternative, further embodiments of the scanning systems may include that the machine includes the encoder, and the machine comprises a motor to drive movement of the scanner arranged at an end of the positional guide.

In addition to one or more of the features described above, or as an alternative, further embodiments of the scanning systems may include that the scanner includes a rotating mirror and the scanner is configured to rotate about an axis that is perpendicular to a rotational axis of the mirror of the scanner.

According to some embodiments, methods of measuring shafts are provided. The methods include disposing a scanning system within the shaft, the scanning system comprising a support structure, a scanner mounted to the support structure, at least one fixed guide, wherein the support structure is configured to move along the at least one fixed guide, at least one positional guide, wherein the at least one positional guide is connected to the support structure to guide movement of the scanner along the at least one fixed guide, and an encoder operably coupled to the at least one positional guide and configured to measure, at least, a distance from the encoder to the support structure, moving the scanner along the shaft, and obtaining measurements of the shaft using the scanner as the scanner moves along the shaft.

In addition to one or more of the features described above, or as an alternative, further embodiments of the methods may include minimizing a relative tilt between the scanner and the support structure using at least one stabilizer arranged between the scanner and the support structure.

In addition to one or more of the features described above, or as an alternative, further embodiments of the methods may include measuring a tilt of at least one of the support structure and the scanner using an inertial measurement unit.

In addition to one or more of the features described above, or as an alternative, further embodiments of the methods may include receiving encoding data from the encoder and scanning data from the scanner at a controller, and correlating the encoding data and the scanning data to determine a location of the scanning data based on a location of the scanner using the controller.

In addition to one or more of the features described above, or as an alternative, further embodiments of the methods may include installing at least one buffer to extend from the support structure that is configured to prevent contact of the scanner with an external structure.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide improved scanning of shafts and similar structures using a single scanner configured to move through the structure and take continuous scans.

It should be appreciated that while embodiments herein may refer to a particular type of measurement device, such as a laser scanner for example, this is for example purposes and the claims should not be so limited. In other embodiments, other types of measurement devices that are configured to measure a surface or an area may be used. These measurement devices include, but are not limited to: triangulation scanners, line scanners, flying spot scanners, structured light scanners (coded or uncoded), laser line probes, time of flight scanners, and laser trackers.

Figure 1A:
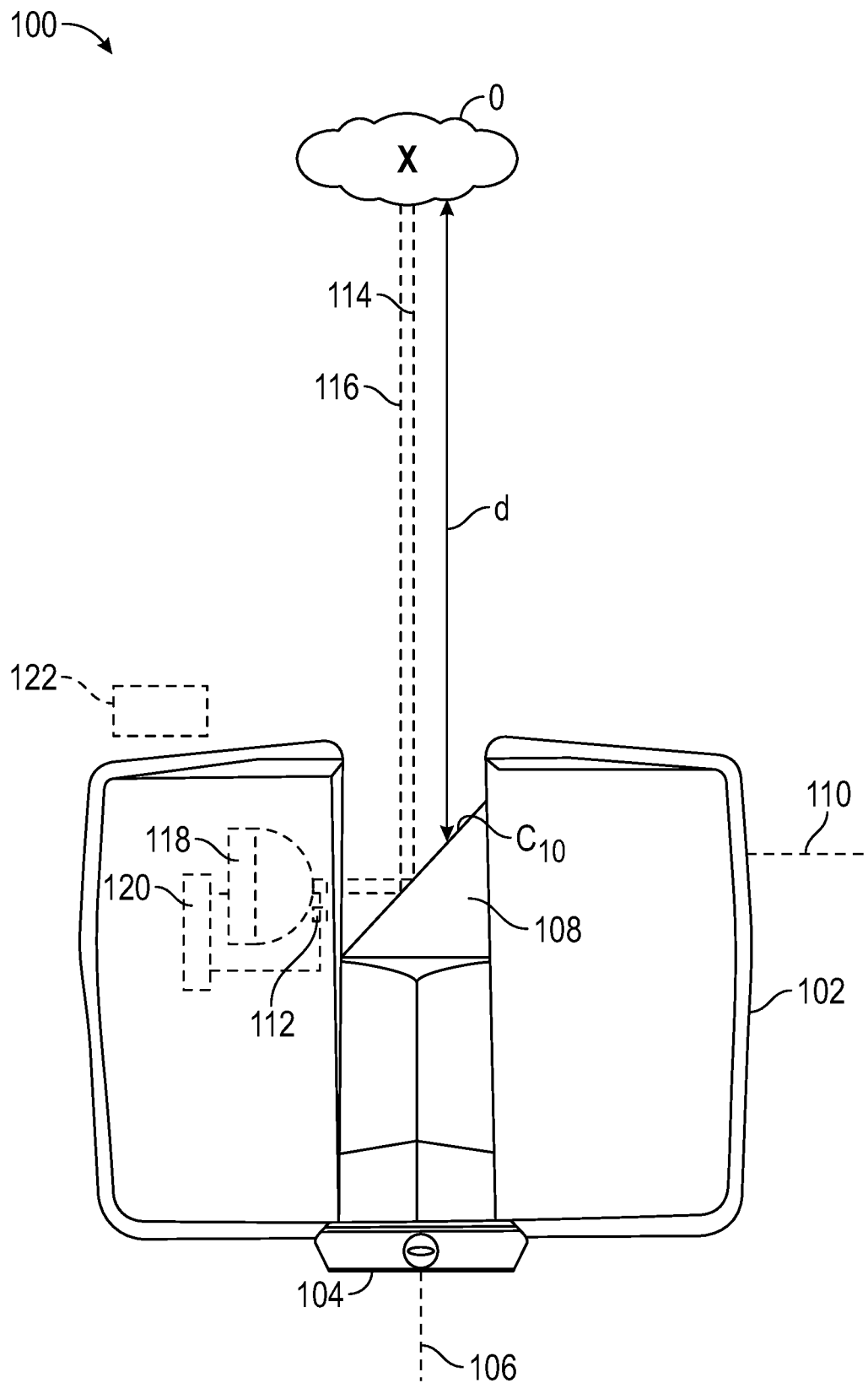
FIG. 1A is a side view of a 3D scanning system in accordance with an embodiment of the present disclosure.
Figure 1B:
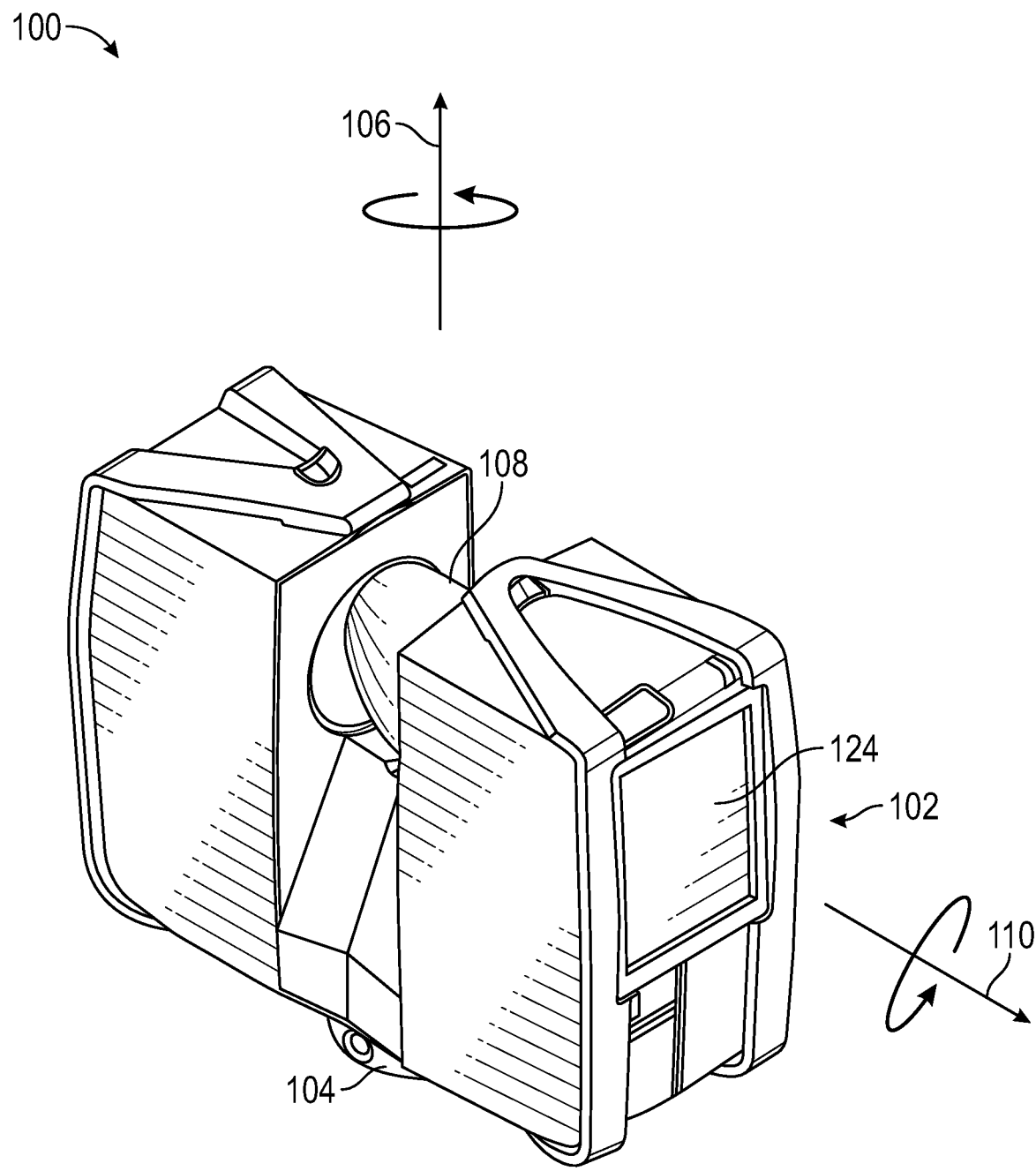
FIG. 1B is a perspective view of the 3D scanning system of FIG. 1A.

Referring to FIGS. 1A-1B, a 3D scanner 100 (e.g., a laser scanner) is shown that may be employed in embodiments of the present disclosure. The 3D scanner 100 may be used for optically scanning and measuring a scanned environment using time-of-flight methods. The 3D scanner 100 comprises a measuring head or housing 102 and a base 104. The housing 102 is mounted on the base 104 such that the housing 102 can rotate with respect to the base 104 about a first axis 106, driven by a first rotary drive (e.g., a motor). The rotation about the first axis 106 may be about the center of the base 104. The housing 102 comprises a mirror 108, which can rotate about a second axis 110, driven by a second rotary drive (e.g., a motor). Referring to a normal upright position of the 3D scanner 100, the first axis 106 may be called the vertical axis or azimuth axis and the second axis 110 may be called the horizontal axis or zenith axis. The 3D scanner 100 may comprise a gimbal point or center $C_{10}$ that is the intersection point of the first axis 106 and the second axis 110.

The housing 102 is provided with an electromagnetic radiation emitter 112, such as a light emitter, that emits an emission light beam 114. In an embodiment, the emission light beam 114 may be a coherent light such as a laser beam. As will be appreciated by those of skill in the art, the laser beam may have a wavelength range of approximately 300 to 1600 nanometers, for example, 790 nanometers, 905 nanometers, 1550 nanometers, or less than 500 nanometers. It should be appreciated that other electromagnetic radiation beams having greater or smaller wavelengths may also be used. The emission light beam 114 may be amplitude or intensity modulated, for example, with a sinusoidal waveform, rectangular waveform, etc. Alternatively, the emission light beam 114 may be otherwise modulated, for example, with a chirp signal, or coherent receiver methods may be used. In the present embodiment, the emission light beam 114 is a continuous wave laser beam. However, it may also be a pulsed laser. The emission light beam 114 is emitted by the light emitter 112 onto the mirror 108, where it is deflected to the environment of the 3D scanner 100.

A reflected light beam, hereinafter called a reception light beam 116, is reflected from the scanned environment by an object O that is within the scanned environment. The reflected or scattered light is intercepted by the rotary mirror 108 and directed onto a light receiver 118 with reception optics. The directions of the emission light beam 114 and the reception light beam 116 result from the angular positions of the housing 102 and the mirror 108 about the axes 106 and 110, respectively. The angular positions, in turn, depend on the corresponding rotary drives. The angle of rotation about the first axis 106 is measured by a first angular encoder. The angle of rotation about the second axis 110 is measured by a second angular encoder. The use of angular encoders is well understood and implementation thereof, along with the rotary drives or motors, will not be described further in order to simplify discussion of the present configuration.

A controller 120 is coupled to communicate with the light emitter 112 and the light receiver 118 inside the housing 102. It should be appreciated that while the controller 120 is illustrated as being a single device or circuit, this is for exemplary purposes and the claims should not be so limited.

In other embodiments, the controller 120 may be comprised of a plurality of devices or circuits. In some embodiments, a portion of the controller 120 may be arranged outside the housing 102, for example, as a computer connected to the base 104 or other components of the 3D scanner 100.

The operation of the 3D scanner 100 is controlled by the controller 120. The controller 120 is a suitable electronic device capable of accepting data and instructions, executing the instructions to process the data, and, in some configurations, presenting the results. The controller 120 may accept instructions through a user interface, or through other means such as but not limited to electronic data card, voice activation means, manually-operable selection and control means, radiated wavelength and electronic or electrical transfer. The controller 120 may be and/or may include a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid or combination of any of the foregoing.

The controller 120, in some embodiments, is capable of converting an analog voltage or current level provided by sensors (e.g., encoders) into digital signal(s). Alternatively, sensors may be configured to provide a digital signal to the controller 120, or an analog-to-digital (A/D) converter (not shown) maybe coupled between sensors and the controller 120 to convert the analog signal provided by sensors into a digital signal for processing by the controller 120. The controller 120 is configured to receive and use the digital signals as input to various processes for controlling the 3D scanner 100. The digital signals represent one or more system data including but not limited to angular position about the first axis 106, angular position about the second axis 110, time-of-flight of the light beams 114, 116, and the like.

In general, the controller 120 accepts data from sensors, light emitter 116 and light receiver 120, and is given certain instructions for the purpose of determining three-dimensional coordinates of points in the scanned environment. Further, the controller 120 may compare operational parameters to predetermined variances and if a predetermined variance is exceeded, the controller 120 can generate a signal that may be used to indicate an alarm to an operator. Additionally, the signal may initiate other control methods that adapt the operation of the laser scanner 100 such as changing or stopping the rotation about the first axis 106 once a predetermined angular position is achieved.

In some embodiments, the 3D scanner 100 may optionally include an imaging camera 122 that acquires two-dimensional (2D) color images of the scanned environment as a scan is performed. The 2D images may be synchronized with the acquired 3D coordinate points obtained by the 3D scanner 100. This allows for the association of a color and/or a texture with the 3D coordinate point by the controller 120. In some embodiments, the imaging camera 122 is disposed internally to the laser scanner 100 and acquires images via the mirror 108.

In addition to being coupled to one or more components within the 3D scanner 100, the controller 120 may also be coupled to external computer networks such as a local area network (LAN) and/or the Internet. A LAN interconnects one or more remote computers, which are configured to communicate with the controller 120 using a well-known computer communications protocol such as TCP/IP (Transmission Control Protocol/Internet Protocol), RS-232, Mod-Bus, and the like. Additional systems, similar to 3D scanner 100 (i.e., multiple scanners), may be connected to a LAN with respective controllers. Each of the systems may be configured to send and receive data to and from remote computers and other systems. In some embodiments, the LAN may be connected to the Internet. An Internet connection can allow the controller 120 to communicate with one or more remote computers or other systems connected to the Internet.

The controller 120, in one non-limiting example, includes a processor coupled to a random access memory device, a non-volatile memory device, a read-only memory (ROM) device, one or more input/output controllers and/or elements as known in the art, and an optional LAN interface device via a data communications bus. In embodiments having a LAN interface device, the LAN interface device provides for communication between the controller and a network in a data communications protocol supported by the network, as noted above. The ROM device can be configured to store an application code, e.g., main functionality firmware, including initializing parameters, and boot code, for the processor of the controller 120. Application code also includes program instructions for causing the processor to execute any operation control methods of the 3D scanner 100, including starting and stopping operation, changing operational states of the 3D scanner 100, monitoring predetermined operating parameters, generation of alarms, etc. In an embodiment, the application code can create an onboard telemetry system that may be used to transmit operating information between the 3D scanner 100 and one or more remote computers or receiving locations. The information to be exchanged with remote computers and the 3D scanner 100 can include but are not limited to 3D coordinate data and images associated with a scanned environment.

The non-volatile memory device may be any form of non-volatile memory such as an EPROM (Erasable Programmable Read Only Memory) chip, a disk drive, or the like. Stored in the non-volatile memory device may be various operational parameters for the application code. The various operational parameters can be input to non-volatile memory device either locally, using a user interface or through use of a remote computer, or remotely via the Internet using a remote computer. It will be recognized that application code can be stored in non-volatile memory device or the read-only memory device of the 3D scanner 100.

The controller may include operational control methods embodied in application code. The methods are embodied in computer instructions written to be executed by the processor, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby, and/or, for example, any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller of the 3D scanner 100 may be configured to process data furnished to generate the 3D scans from images or data captured by the light receiver 118. The 3D scans in turn are joined or registered in a common coordinate frame of reference. For registering, known methods can be used, such as by identifying natural or artificial targets (i.e., recognizable structures within a scanned environment) in overlapping areas of two or more frames captured by the light receiver 118. In an embodiment, multiple frames may be dynamically registered using a local bundle adjustment method. Through identification of these targets, the assignment of two 3D scans may be determined by means of corresponding pairs. A whole scene (i.e., a plurality of frames) is thus gradually registered by the 3D scanner 100. In some embodiments, the individual frames may be registered to a point cloud generated by a laser scanner.

In an embodiment, the controller 120 further includes an energy source, such as battery. The battery may be an electrochemical device that provides electrical power for the controller 120. In an embodiment, the battery may also provide electrical power to the 3D scanner 100 (e.g., cameras, sensors, motors, projectors, etc.). In some embodiments, the battery may be separate from the controller 120 (e.g. a battery pack). In an embodiment, a second battery (not shown) may be disposed in the housing 102 to provide electrical power to the other components of the 3D scanner 100 (e.g., cameras, sensors, motors, projectors, etc.). Alternatively, in some embodiments, power may be supplied from an outlet or other continuous power source, as will be appreciated by those of skill in the art.

It should be appreciated that while the controller 120 is illustrated as being installed within the housing 102, this is for exemplary purposes and the claims should not be so limited. In other embodiments, the controller 120 may be separate from the housing 102. Further, while embodiments herein illustrate the controller 120 as being part of a single 3D scanner 100, this is for exemplary purposes and the claims should not be so limited. In other embodiments, the controller 120 may be coupled to and combine three-dimensional coordinate data from multiple 3D scanners 100.

Referring again to FIG. 1A, the controller 120 includes operation control methods embodied in application code. The controller 120 is configured to perform operational control methods that determine, for a multitude of measuring points X, a corresponding number of distances d between the 3D scanner 100 and the measuring points X on object O in the scanned environment. The distance to a particular measuring point X is determined based at least in part on the speed of light in air through which electromagnetic radiation propagates from the 3D scanner 100 to the measuring point X In an embodiment, the phase shift in a modulated light beam 114, 116 sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (i.e., the round-trip time for the light to travel from the device to the object and back to the device (duration of light beam 114, 116)). A method of measuring distance based on the time-of-flight of light (or the time-of-flight of any type of electromagnetic radiation) depends on the speed of light in air and is therefore distinguishable from methods of measuring distance based on triangulation or other methods.

In an embodiment, the housing 102 may include a display device 124, as shown in FIG. 1B, integrated into the 3D scanner 100. The display device 124 can include a user interface, which may be a graphical touch screen. For example, the display device 124 may have a user interface that allows the operator to provide measurement instructions to the 3D scanner 100, in particular to set the parameters or initiate the operation of the 3D scanner 100, and the display device 124 may also display measurement results.

In an embodiment, the scanning of a scanned environment by the 3D scanner 100 may take place by rotating the mirror 108 relatively quickly about the second axis 110 while rotating the housing 102 relatively slowly about the first axis 106, thereby emitting the light 114 in a spiral pattern. In a non-limiting example, the rotary mirror 108 may be driven to rotate at a speed of 5820 revolutions per minute. A scan is defined to be the entity of measuring points X in such a measuring. For such a scan, the center $C_{10}$ defines the origin of the local stationary reference system. The base 104 rests in this local stationary coordinate frame of reference.

Figure 2:
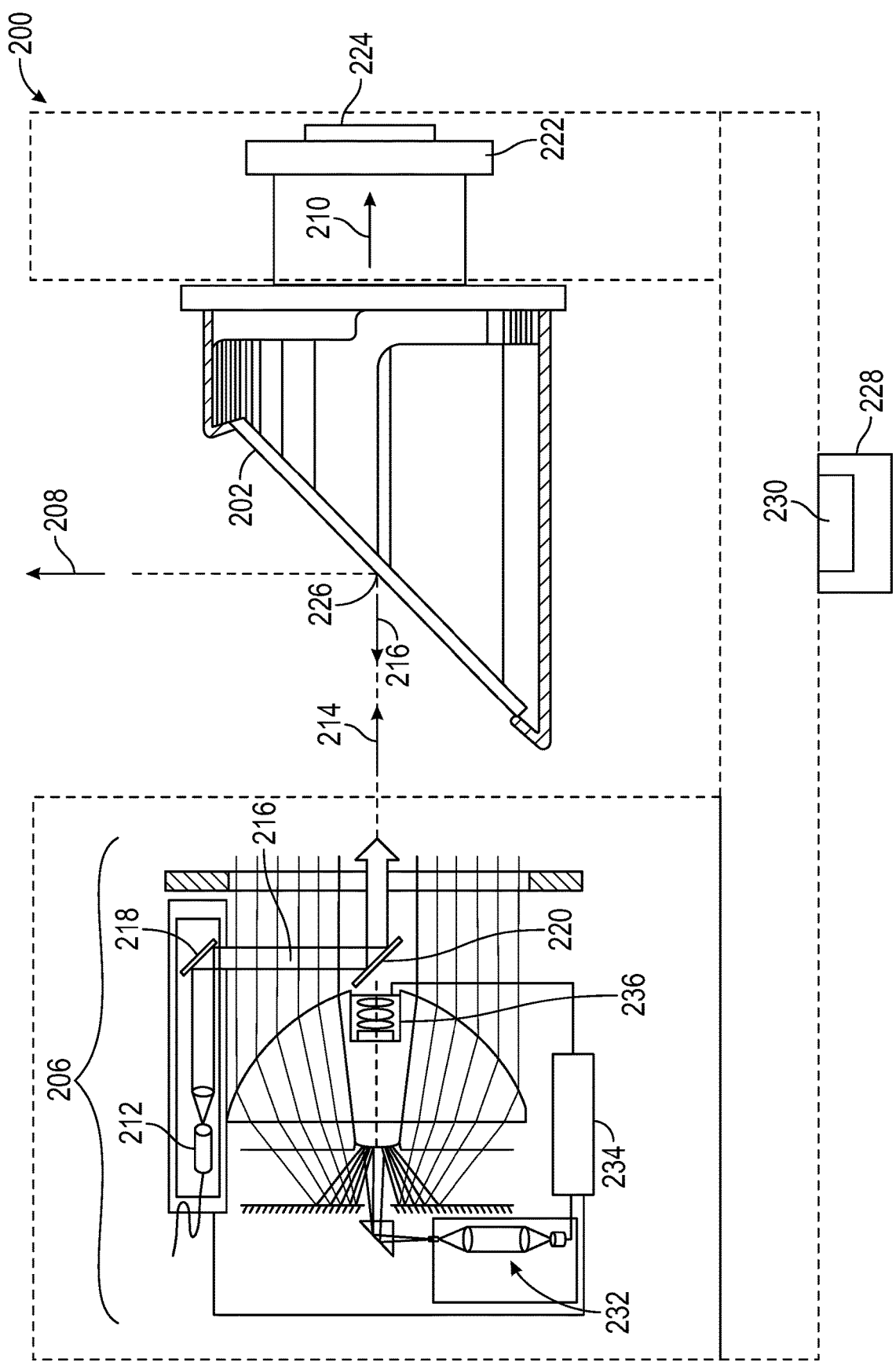
FIG. 2 is a schematic illustration of internal components of a 3D scanning system in accordance with an embodiment of the present disclosure.

Turning now to FIG. 2, a schematic illustration of a 3D scanner 200 in accordance with an embodiment of the present disclosure is shown. The 3D scanner 200 may be similar to that shown and described with respect to FIGS. 1A-1B and thus some features may not be discussed in detail again. In this illustrative embodiment, the 3D scanner 200 includes a rotary mirror 202 mounted within a housing 204. The 3D scanner 200 further includes a sensor assembly 206 arranged relative to the rotary mirror 202 such that light may be projected onto the rotary mirror 202 and light reflected thereon may be received at one or more light detectors of the sensor assembly 206. The housing 204 may be rotatable about a first axis 208 and the rotary mirror 202 may be rotatable about a second axis 210.

As shown, the sensor assembly 206 includes a light emitter 212. The light emitter 212 may be configured to emit and generate an emitted light beam 214 that is projected upon the rotary mirror 202, reflects off an object, and is subsequently reflected off of the rotary mirror 202 and back into the sensor assembly as a reflected light beam 216, as described above. In this embodiment, light 216 from the light emitter 212 reflects off a fixed mirror 218 and travels to dichroic beam-splitter 220 that reflects the light 216 from the light emitter 212 onto the rotary mirror 202. In this embodiment, the rotary mirror 202 is rotated by a motor 222 and the angular/rotational position of the rotary mirror 202 is measured by an angular encoder 224. Thus, the emitted light beam 214 may be reflected and direction about an environment in which the 3D scanner 200 is located. The 3D scanner 200 includes a gimbal point 226 that is a center of rotation about the first axis 208 and the second axis 210.

The housing 204 may be mounted to a base 228 configured to rotate the housing 204 about the first axis 208. The base 228 may include a respective angular encoder 230 configured to measure a rotation of the base 228 about the first axis 208. The combination of the rotation about the first axis 208 and the second axis 208, and projection of light and receipt thereof, enables scanning of an environment.

The sensor assembly 206 includes a light receiver 232. Coupled to the light emitter 212 and the light receiver 232 is a controller 234, as described above. The controller 234 is configured to determine, for a multitude of measuring points in an environment, a corresponding number of distances between the 3D scanner 200 and the points in the environment. The controller 234 is further configured to obtain or accept data from encoders 224, 230, light receiver 232, light source 212, and any additional components (e.g., auxiliary/imaging camera) and is given certain instructions for the purpose of generating a 3D point cloud of a scanned environment.

As shown, the 3D scanner 200 further includes an image acquisition device 236 (e.g., a central imaging camera) located internally to the housing 204 and may have the same optical axis as the 3D scanner device (e.g., second axis 210). In this embodiment, the image acquisition device 236 is integrated into the housing 204 (e.g., measuring head) and arranged to acquire images along the same optical pathway as an emitted light beam 214 and reflected light beam 216. In this configuration, the dichroic beam-splitter 220 allows light to pass through at wavelengths different than the wavelength of light 216 that is emitted from the light emitter 212. For example, the light emitter 212 may be a near infrared laser light (for example, light at wavelengths of 780 nm or 1150 nm), with the dichroic beam-splitter 220 configured to reflect the infrared laser light while allowing visible light (e.g., wavelengths of 500 to 700 nm) to transmit therethrough. In other embodiments, the determination of whether the light passes through the beam-splitter 220 or is reflected depends on the polarization of the light. The image acquisition device 236 can be configured to obtain 2D images of the scanned area to capture image data to add to the scanned image. In the case of a built-in imaging camera having an optical axis coincident with that of the 3D scanning device, the direction of the camera view may be easily obtained by simply adjusting the steering mechanisms of the scanner—for example, by adjusting the azimuth angle about the first axis 208 and by steering the rotary mirror 202 about the second axis 210.

Figure 3:
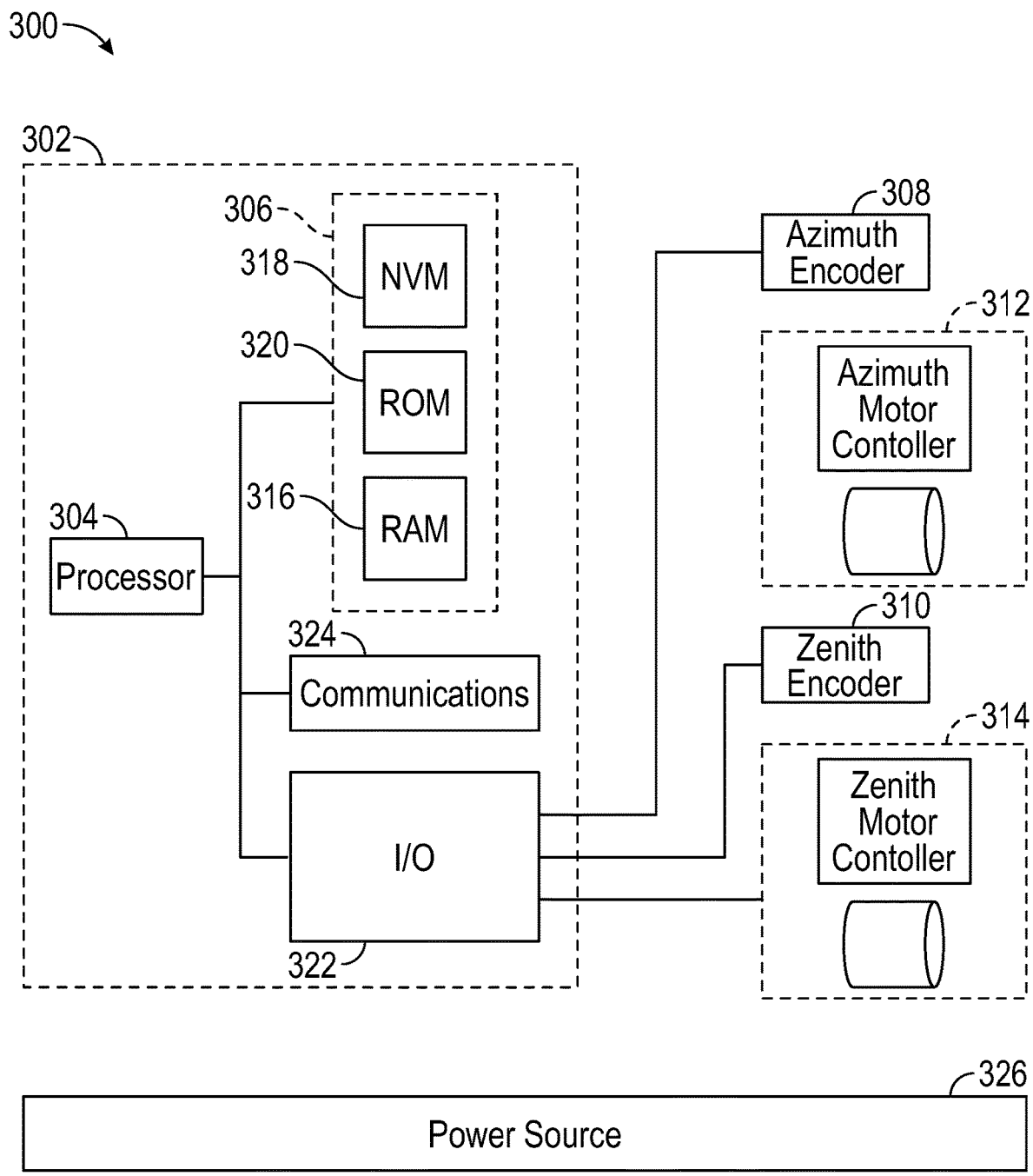
FIG. 3 is a schematic illustration of components and orientation thereof of a 3D scanner in accordance with an embodiment of the present disclosure.

Referring now to FIG. 3, elements of a laser scanner 300 in accordance with an embodiment of the present disclosure are shown. The laser scanner 300 may be employed and configured, for example, similar to the systems shown and described above with respect to FIGS. 1 and 2. A controller 302 is provided within the laser scanner 300. The controller 302 is a suitable electronic device capable of accepting data and instructions, executing the instructions to process the data, and presenting the results. The controller 302 includes one or more processing elements, such as a processor 304. The processor 304 may be one or more of microprocessors, field programmable gate arrays (FPGAs), digital signal processors (DSPs), and generally any devices capable of performing computing functions. The processor 304 can have access to or may be operably connected to a memory 306 configured to store information and data.

The controller 302, in some embodiments, is configured to convert an analog voltage or current level provided by a light receiver into a digital signal to determine a distance from the laser scanner 300 to an object in an environment. The controller 302 is configured to employ or process digital signals that act as input to various processes for controlling the laser scanner 300. The digital signals represent data including, but not limited to, distance to an object, images of the environment, images acquired by a panoramic camera, angular and/or rotational measurements by a first axis or azimuth encoder 308, and angular and/or rotational measurements by a second axis or zenith encoder 310.

In general, the controller 302 accepts data from the encoders 308, 310, a light receiver, a light source, and a panoramic camera and is given certain instructions for the purpose of generating a 3D point cloud of a scanned environment. The controller 302 is configured to provide operating signals to the light source, the light receiver, the panoramic camera, an azimuth motor controller 312, and a zenith motor controlled 314. The controller 302 is configured to compare operational parameters to predetermined variances and, if the predetermined variance is exceeded, the controller 302 is configured to generate a signal that alerts an operator to a condition. The data received by the controller 302 may be displayed on a user interface coupled to controller 302. The user interface may be one or more LEDs (light-emitting diodes) or LED display, an LCD (liquid-crystal diode) display, a CRT (cathode ray tube) display, a touch-screen display, or the like. A keypad may also be coupled to the user interface for providing data input to the controller. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 300.

The controller 302 may also be coupled to one or more external computer networks such as a local area network (LAN) and the Internet. A LAN interconnects one or more remote computers, which are configured to communicate with controller 302 using a well-known computer communications protocol such as TCP/IP (Transmission Control Protocol/Internet(ˆ) Protocol), RS-232, ModBus, and the like. Additional systems may also be connected to LAN with a controller in each of these systems being configured to send and receive data to and from remote computers and other systems. The LAN may be connected to the Internet. This connection may be configured to allow the controller 302 to communicate with one or more remote computers connected to the Internet.

The processor 304, as noted above, is coupled to the memory 306. The memory 306 may include one or more random access memory (RAM) devices 316, one or more non-volatile memory (NVM) devices 318, and/or one or more read-only memory (ROM) devices 320. In addition, the processor 304 may be connected to one or more input/output (I/O) controllers 322 and a communications circuit 324. In an embodiment, the communications circuit 324 is configured to provide an interface that allows wireless or wired communication with one or more external devices or networks, such as the LAN discussed above. The laser scanner 300 may include or be electrically connected a power source 326, which is configured to supply electrical power to the various electronic components and devices of the laser scanner 300.

The laser scanners described above may be employed with embodiments of the present disclosure to perform scanning of shafts and similar structures. Such laser scanners can include software for performing operations. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Highly precise and efficient 3D measurement of long and narrow shafts and similar structures can be a challenge. Such measurements may be achieved using laser scanners as shown and described above, for example. If, for example, a homogeneous elevator shaft is to be scanned, many scan positions at the exits of the shaft are necessary. Even though the laser scanner has a long range of up to 350 m, due to the narrow angle beginning at a distance of 50 m between the scanner and a wall of the shaft, few xyz-measurements are recorded. As such, moving a scanner from one position to another along a shaft may be required for complete scanning of a shaft. Such movement, placement, and scanning can be a time-consuming process. Accordingly, embodiments of the present disclosure are directed to providing accurate scanning of shafts and similar structures. As used herein, the term "shaft" refers to vertical, horizontal, and skew passages that are substantially homogenous and relatively narrow. The term "shaft" includes, without limitation, elevator shafts, building shafts, tunnels, wells, conduits, culverts, ducts, pipes, and the like. The term "shaft" refers to generally enclosed spaces or structures that have a passage defined therein, with such structures being substantially homogenous, such as without bends, turns, corners, and the like, and/or without internal structures.

Figure 4B:
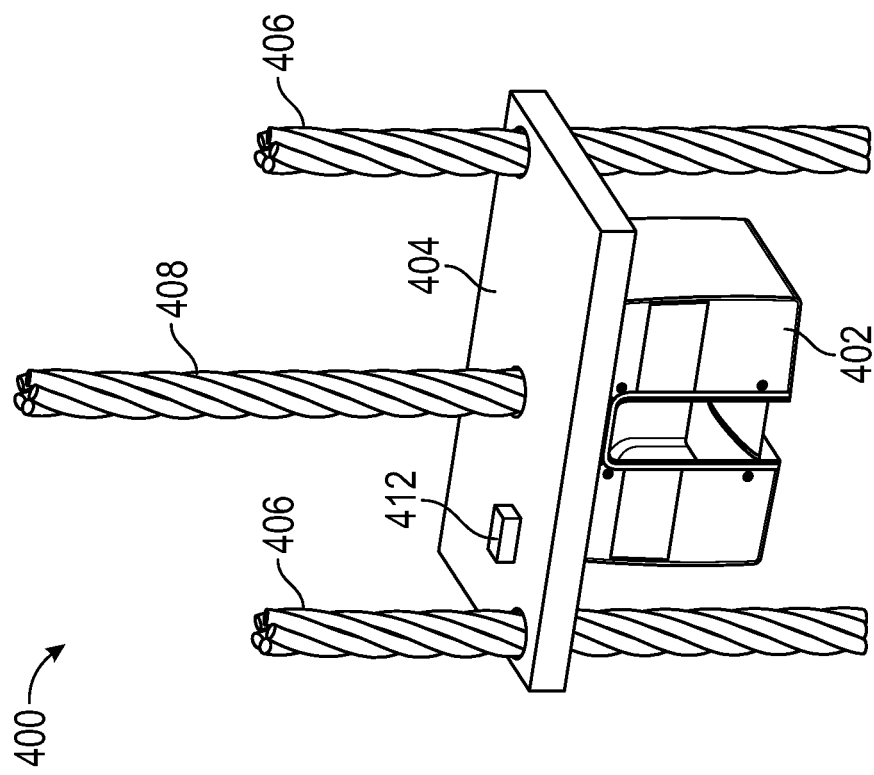
FIG. 4B is a perspective view of the scanning system of FIG. 4A.
Figure 4A:
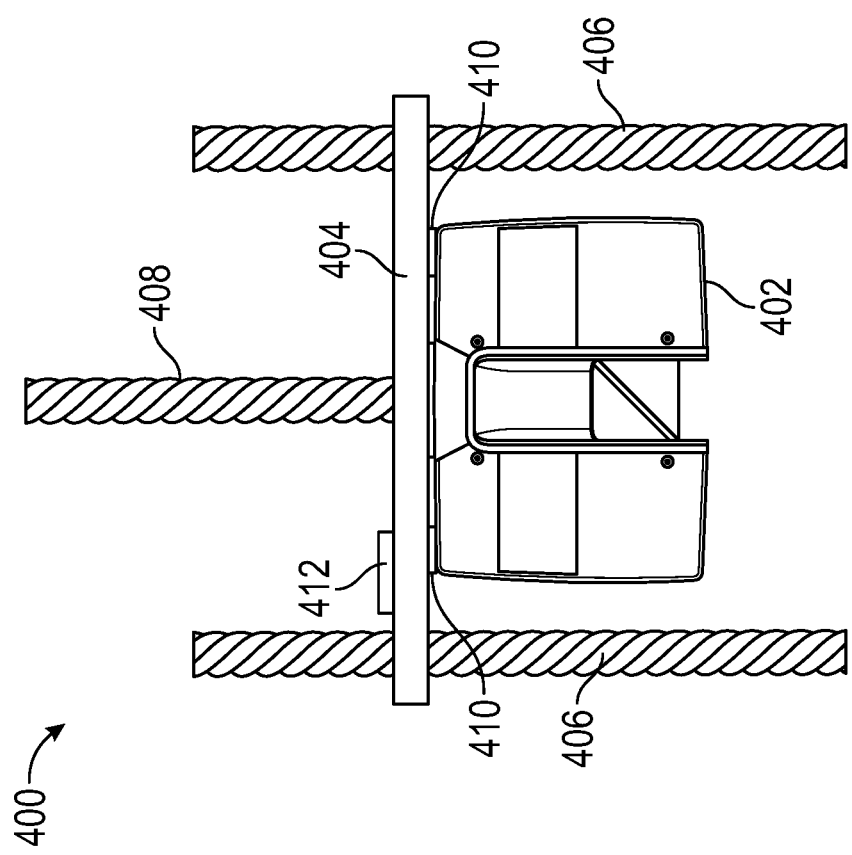
FIG. 4A is a side view of a scanning system in accordance with an embodiment of the present disclosure.

Turning now to FIGS. 4A-4B, schematic illustrations of a scanning system 400 in accordance with an embodiment of the present disclosure are shown. The scanning system 400 may be used for imaging and/or scanning of a shaft or similar structure. The scanning system 400 includes a scanner 402 that is mounted on a support structure 404. The support structure 404 is arranged to travel or move along one or more fixed guides 406. The support structure 404 is attached to one or more positional guides 408.

The scanner 402 may be similar to one or more of the scanners shown and described above, or may be a scanner having a different configuration and/or operation, as will be appreciated by those of skill in the art. The scanner 402 may be fixedly or movably mounted to the support structure 404. In a fixed configuration, the scanner 402 may be positionally and rotationally fixed in relationship with the support structure 404. Such fixed attachment or mounted may be provided by one or more fasteners, adhesives, bonding, welding, snap connections, or other means and mechanisms for mounting the scanner 402 to the support structure 404. In some embodiments of the fixed configuration, the support structure 404 may be formed as part of a housing or other integral configuration. For example, no fastener or external mechanism is employed, but rather the support structure 404 is part of the scanner 402. In other embodiments, the scanner 402 may be movably mounted to the support structure 404 such that the scanner 402 can rotate about an axis of the scanner 402 (e.g., as shown and described with respect to FIGS. 1A-1B).

The support structure 404 may be a plate, bracket, or other rigid structure that is configured to engage with each of the scanner 402, the fixed guides 406, and the positional guides 408. As shown, two fixed guides 406 are arranged to pass through the support structure 404 and the support structure 404 is arranged to move or travel along the fixed guides 406. In other configurations, a single fixed guide may be employed, or more than two fixed guides may be employed. The support structure 404 is configured to stay level or remain level such that as the support structure 404 travels along the fixed guides 406 the support structure 404 does not tilt. In some embodiments, the scanner 402 may be mounted to the support structure 404 by one or more stabilizers 410 such as shocks, springs, suspension systems, or the like.

The fixed guides 406 may be ropes, cables, wires, rods, poles, or the like. The fixed guides 406 may be arranged within and along a shaft that is to be scanned. In some configurations, the fixed guides 406 may be fixed at two locations along a shaft (e.g., at each end), and, in other embodiments, the fixed guides 406 may be fixed at a single location (e.g., at the top of a shaft). The fixed guides 406 may be arranged to prevent tilt, or changes from level, of the support structure 404. However, in some embodiments, and as shown, an inertial measurement unit 412 may be affixed to the support structure 404 and/or to the scanner 402 itself, to detect and allow correction for any tilt that may occur during operation.

The positional guides 408 may be ropes, cables, wires, rods, poles, or the like. In some embodiments the fixed guides 406 and the positional guides 408 have substantially the same structure, whereas in other embodiments, the fixed guides 406 may be structurally different from the positional guides 408. The positional guides 408 may be a controllable length of material that can be played out to either move the scanner 402 or allow the scanner 402 to move along the fixed guides 406. For example, if the shaft through this the scanner 402 is to be moved and scan is a vertical shaft, the positional guide 408 may be a rope or cable that suspends the support structure 404 therefrom. In such case, a downward movement of the scanner along the shaft may be the force of gravity, and an upward movement of the scanner may be by pulling upward on the positional guide 408 (e.g., by a machine or by hand). In a horizontal shaft, the movement of the scanner may be by a semi-rigid cable or rod that forms the positional guide 408.

Figure 5:
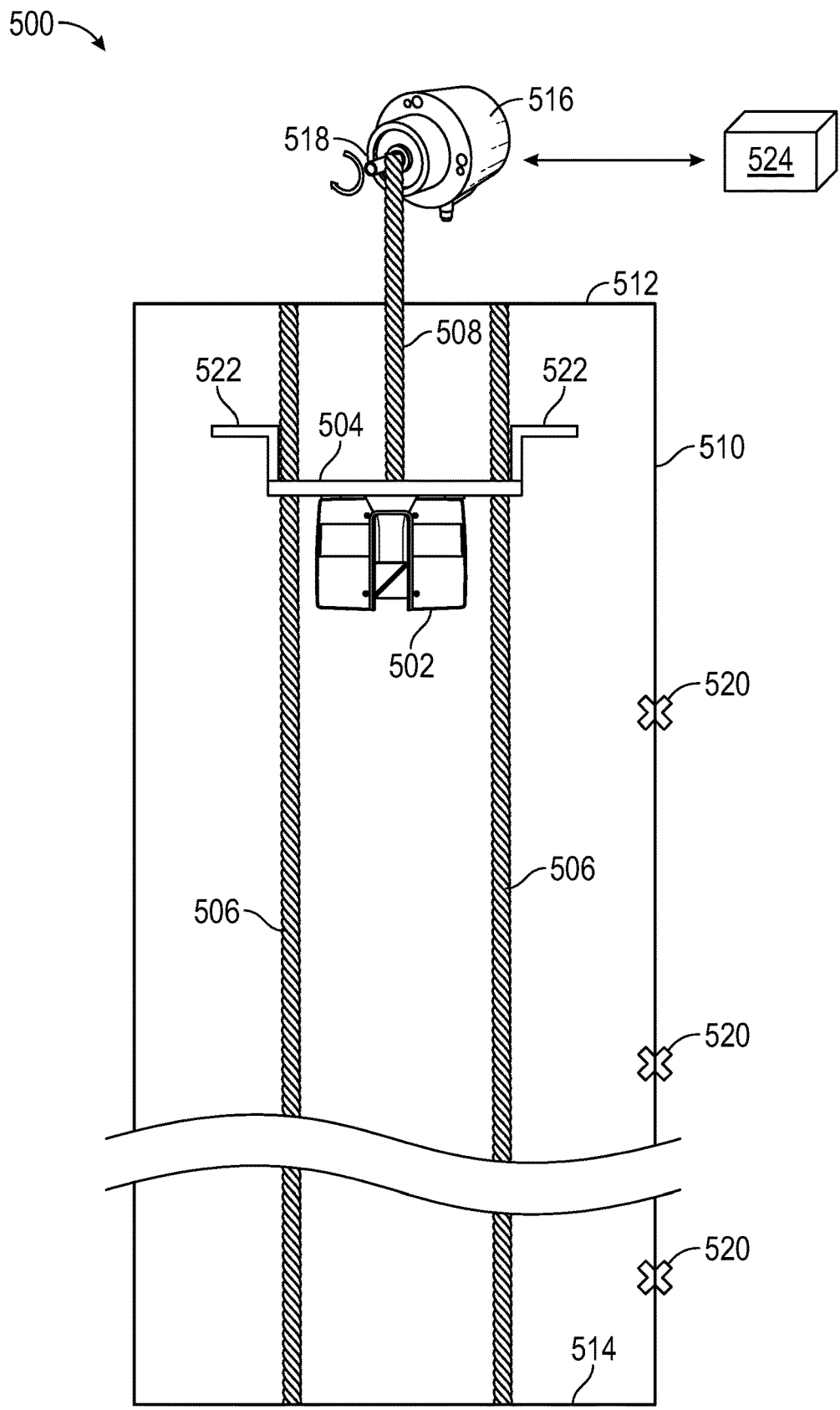
FIG. 5 is a schematic illustration of a scanning system in accordance with an embodiment of the present disclosure.

Turning now to FIG. 5, a schematic illustration of a scanning system 500 in accordance with an embodiment of the present disclosure are shown. The scanning system 500 may be used for imaging and/or scanning of a shaft or similar structure. The scanning system 500 includes a scanner 502 that is mounted on a support structure 504. The support structure 504 is arranged to travel or move along one or more fixed guides 506. The support structure 504 is attached to one or more positional guides 508.

As shown in FIG. 5, the scanner 502 is arranged within a shaft 510 and configured to scan the shaft 510. The scanner 502 may be configured to measure a length or depth of the shaft to a high degree of accuracy. The shaft 510 extends between a first end 512 and a second end 514. In FIG. 5, the shaft 510 is a vertical shaft with the scanner 502 arranged proximate the first end 512 of the shaft 510. The scanner 502 may be moved through the shaft 510 along the fixed guides 506 to enable scanning of the shaft 510.

In this embodiment, the positional guide 508 is operably connected to a machine 516. The machine 516 may include a motor and be configured to wind and unwind the positional guide 508 and thus cause the support structure 504 and the scanner 502 to travel along the fixed guides 506. The machine 516 may be manually operated, such as by use of a handle or crank, or may be motorized to drive the movement (e.g., electrical motor, pneumatic motor, etc.). In this illustrative embodiment, the machine 516 includes an encoder 518. The encoder 518 may be arranged to monitor an amount of length of deployment of the positional guide 508 and thus an accurate position of the scanner 502 along the shaft 510 may be provided. By knowing the location of the scanner 502 within the shaft 510, highly accurate measurements of the shaft may be achieved. In one non-limiting embodiment, the machine 516 comprises only the encoder 518 and the positional guide 508 is passed through the encoder 518 to monitor the position of the scanner 502 within the shaft 510. As noted above, in some embodiments, the fixed guides 508 may be affixed to both the first end 512 of the shaft 510 and the second end of the shaft 510. However, in other embodiments, one end of the fixed guides 508 may be free and not affixed to anything.

In operation, a data collection process employing a scanning system in accordance with an embodiment of the present disclosure may be described as follows, with reference to FIG. 5. The encoder 518 and the scanner 502 are synchronized in a timely manner to provide correct mapping of data obtained from each of the scanner 502 (scanning data) and the encoder 518 (encoding data). In an embodiment, this includes associating a time stamp with each of the encoder data and the scanning data. The time stamp may then be used to correlate the encoder data and scanning data. The scanner 502 may include a mirror and the scanner 502 may rotate around its own axis and continuously record data (e.g., time of flight, for example). The starting position of the scanner 502 at the top of the shaft 510 may be assumed to be the zero position. The encoder 518 on the machine 516 may be an incremental encoder that measures revolutions of a drum of the machine 516 and thus may determine the exact length of the positional guide 508 as it is played out into the shaft 510. The length of the positional guide 508 is equal to the position of the scanner 502 in the axial direction of the shaft 510 (e.g., along the shaft from the first end 512 toward the second end 514). As such, the exact position of the scanner 502 within the shaft 510 is always known. The scanner 502 is then lowered down the shaft 510 by increasing the length of the positional guide 508 and traveling along the fixed guides 506. The exact position of the scanner 502 (e.g., encoding data) is used during the processing of the data to calculate a highly precise point cloud from the raw data of the scanner 502 (e.g., scanning data) based on the known trajectory.

The fixed guides 506 ensure that movement or swinging of the scanner 502 is prevented or reduced, and that the scanner 502 travels along a straight line through the shaft 510. Optionally, an inertial measurement unit (IMU) can be mounted on the support structure 504 or the scanner 502 itself for positional accuracy improvement. An IMU may include one or more of accelerometers, inclinometers, gyroscopes and magnetometers for example. The IMU may be used to improve the estimated position or pose of the support structure 504 or scanner 502. In some embodiments, the scanning system 500 can include known markers or targets 520 (e.g., artificial reference spheres or other indicators) that can be mounted in the shaft 510 and used to stabilize position information. In some embodiments, optional buffers 522 can be mounted on the support structure 504 to maintain a minimum distance between the scanner 502 and walls of the shaft 510 to prevent the scanner 502 from contacting the walls of the shaft 510.

In some embodiments, a controller 524 may be operably connected to or otherwise in communication with, at least, the encoder 518 and the scanner 502. The controller 524 may be configured to receive encoding data from the encoder 518 and scanning data from the scanner 502. The controller 524 may then correlate the collected or received data and store such correlated data. In some embodiments, the controller 524 may process the incoming data in real-time and output measurement data. In other embodiments, the controller 524 or associated electronics may store data collected and/or processed by the controller 524 (e.g. in post processing). In some embodiments, the controller 524 may be incorporated into the machine 516 and/or the scanner 502. Alternatively, the controller 524 may be a separate component such as a personal computer, laptop, tablet, mobile device, or other electronic device. In still other embodiments, the controller 524 may be formed by a distributed or cloud networking environment.

Figure 6:
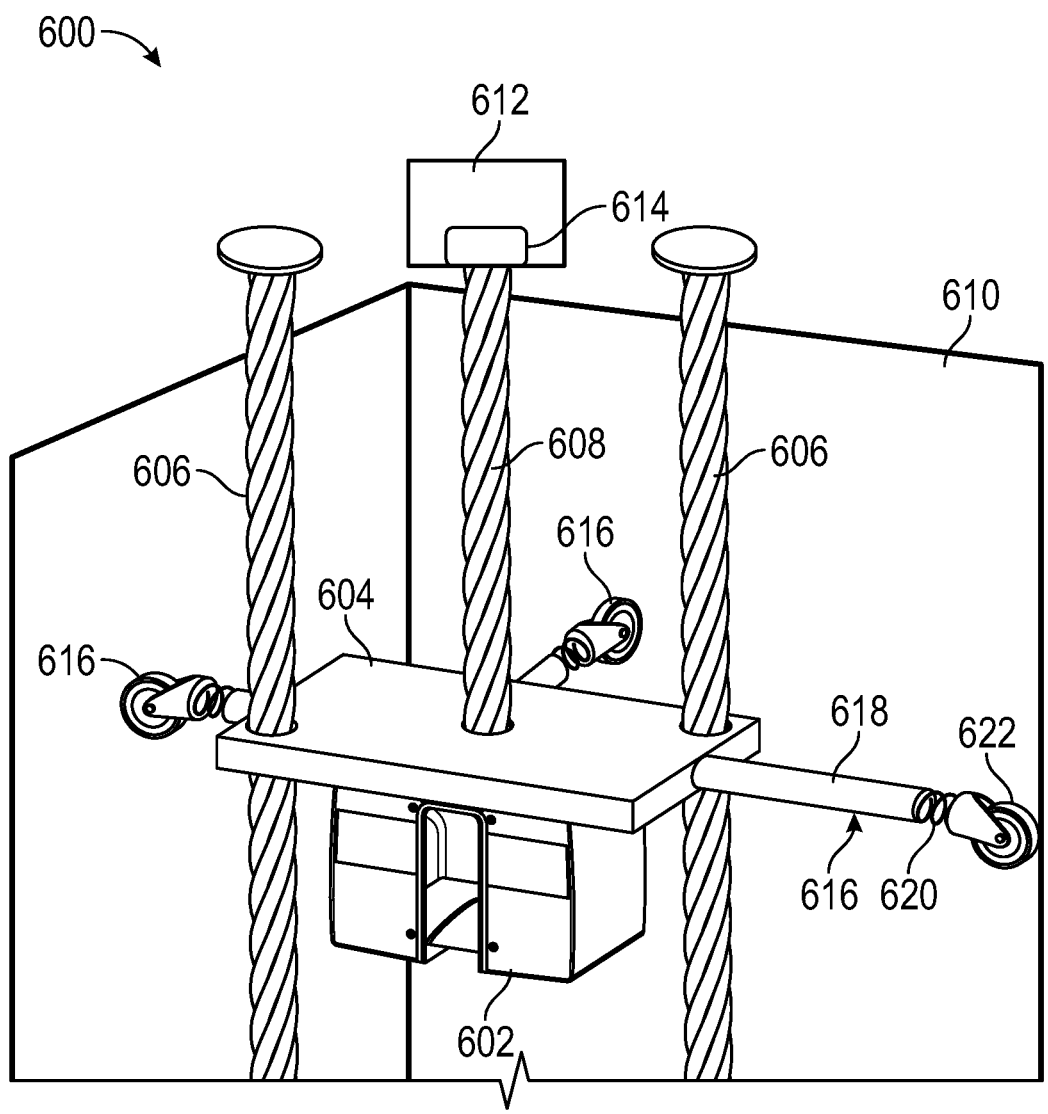
FIG. 6 is a schematic illustration of a scanning system in accordance with an embodiment of the present disclosure.

Turning now to FIG. 6, a schematic illustration of a scanning system 600 in accordance with an embodiment of the present disclosure are shown. The scanning system 600 may be used for imaging and/or scanning of a shaft or similar structure. The scanning system 600 includes a scanner 602 that is mounted on a support structure 604. The support structure 604 is arranged to travel or move along one or more fixed guides 606. The support structure 604 is attached to one or more positional guides 608. The scanner 602 is arranged within a shaft 610 and configured to scan the shaft 610.

In this embodiment, the positional guide 608 is operably connected to a machine 612. The machine 612 may include a motor and be configured to wind and unwind the positional guide 608 and thus cause the support structure 604 and the scanner 602 to travel along the fixed guides 606 through or along the shaft 610. The machine 612 includes an encoder 614. The encoder 614 may be arranged to monitor an amount of length of deployment of the positional guide 608 and thus monitor an accurate position of the scanner 602 along the shaft 610.

As shown in FIG. 6, the scanning system 600 includes buffers 616. The buffers 616 are attached to the support structure 604 to maintain a specific distance between the scanner 602 and walls of the shaft 610 and/or to prevent the scanner 602 from contacting the walls of the shaft 610. In this illustrative embodiment, each buffer 616 includes an extension rod 618, a biasing element 620, and a roller 622. The extension rod 618 may be a telescoping arm or structure that allows for the extension rod 618 to be adjusted in length to ensure that the rollers 622 contact the walls of the shaft 610. The rollers 622 are mounted on biasing elements 620 which are configured to enable some amount of adjustment or non-smooth surface to be run along without impacting the position of the scanner 602 within the shaft 610. The biasing elements 620 may be springs, shocks, pneumatic or hydraulic piston configurations, or the like. The rollers 622 may be wheels, balls, or other rotating structures. The combination of the elements of the buffers 616 is selected to minimize an impact to the scanner 602 as the scanner 602 is conveyed along the shaft (e.g., minimal vibrations, positional adjustments, etc.).

Technical effects and benefits of some embodiments include providing a laser scanning system that can acquire highly accurate measurements of a shaft without expensive or complex setups and components. In accordance with some embodiments, a scanner such as a laser scanner, 3D scanner, or other similar scanner, may be conveyed through a shaft or other similar structure to take measurements thereof. The scanner may be suspended or conveyed by a positional guide along one or more fixed guides. As the scanner moved through the shaft, the position of the scanner within the shaft may be accurately measured, thus enabling synchronized data to be collected (scanning data and encoder data) thus providing for a highly accurate measurement of the shaft.

As noted above, although example embodiments are described above employing a particular type of measurement device, such as a laser scanner, these examples are for explanatory and illustrative purposes and the claims should not be so limited. In some embodiments in accordance with the present disclosure, other types of measurement devices that are configured to measure a surface or an area may be used. These measurement devices include, but are not limited to: triangulation scanners, line scanners, flying spot scanners, structured light scanners (coded or uncoded), laser line probes, time of flight scanners, and laser trackers.

The terms "about" and "substantially" are intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A scanning system for measuring a shaft, the scanning system comprising:
   a support structure;
   a scanner mounted to the support structure;
   at least one fixed guide, wherein the support structure is configured to move along the at least one fixed guide;
   at least one positional guide, wherein the at least one positional guide is connected to the support structure to guide movement of the scanner along the at least one fixed guide;
   an encoder operably coupled to the at least one positional guide and configured to measure, at least, a distance from the encoder to the support structure; and
   at least one stabilizer arranged between the scanner and the support structure, wherein the at least one stabilizer is configured to minimize relative tilt between the scanner and the support structure.

2. The scanning system of claim 1, further comprising an inertial measurement unit configured to measure a tilt of at least one of the support structure and the scanner.

3. The scanning system of claim 1, wherein the at least one fixed guide is one of a rope, a cable, a rod, a pole, and a wire.

4. The scanning system of claim 1, wherein the at least one positional guide is one of a rope, a cable, a rod, a pole, and a wire.

5. The scanning system of claim 1, wherein the scanner is a laser scanner.

6. The scanning system of claim 1, further comprising a controller configured to receive encoding data from the encoder and scanning data from the scanner, the controller configured to correlate the encoding data and the scanning data to determine a location of the scanning data based on a location of the scanner.

7. The scanning system of claim 1, further comprising at least one buffer extending from the support structure and configured to prevent contact of the scanner with an external structure.

8. The scanning system of claim 7, wherein the buffer comprises a biasing element and a roller, the roller configured to contact the external structure.

9. The scanning system of claim 8, wherein the buffer includes an extension rod, wherein the extension rod is attached to the support structure, with the biasing element and the roller arranged at an end of the extension rod.

10. The met scanning system of claim 1, wherein the at least one fixed guide is configured to be secured to an end of a shaft.

11. The scanning system of claim 1, further comprising one or more targets configured to be arranged along a shaft and detected by the scanner.

12. The scanning system of claim 1, further comprising a machine configured to play out the positional guide.

13. The scanning system of claim 12, wherein the machine includes the encoder, and the machine comprises a motor to drive movement of the scanner arranged at an end of the positional guide.

14. The scanning system of claim 1, wherein the scanner includes a rotating mirror and the scanner is configured to rotate about an axis that is perpendicular to a rotational axis of the mirror of the scanner.

15. A method of measuring a shaft, the method comprising:
   disposing a scanning system within the shaft, the scanning system comprising a support structure, a scanner mounted to the support structure, at least one fixed guide, wherein the support structure is configured to move along the at least one fixed guide, at least one positional guide, wherein the at least one positional guide is connected to the support structure to guide movement of the scanner along the at least one fixed guide, and an encoder operably coupled to the at least one positional guide and configured to measure, at least, a distance from the encoder to the support structure;

moving the scanner along the shaft;

obtaining measurements of the shaft using the scanner as the scanner moves along the shaft; and minimizing a relative tilt between the scanner and the support structure using at least one stabilizer arranged between the scanner and the support structure.

16. The method of claim 15, further comprising measuring a tilt of at least one of the support structure and the scanner using an inertial measurement unit.

17. The method of claim 15, further comprising:

receiving encoding data from the encoder and scanning data from the scanner at a controller; and correlating the encoding data and the scanning data to determine a location of the scanning data based on a location of the scanner using the controller.

18. The method of claim 15, further comprising installing at least one buffer to extend from the support structure that is configured to prevent contact of the scanner with an external structure.

19. A scanning system, comprising:

a support structure;

a scanner mounted to the support structure;

a buffer extending from the support structure to prevent contact of the scanner with an external structure, the buffer comprising an extension rod attached to the support structure, a biasing element, and a roller configured to contact the external structure, the biasing element and the roller arranged at an end of the extension rod;

a fixed guide along which the support structure moves;

a positional guide connected to the support structure to guide movement of the scanner along the fixed guide; and an encoder coupled to the positional guide for measuring a distance from the encoder to the support structure.

* * * * *